(12) United States Patent
Stauffer

(10) Patent No.: US 10,199,127 B2
(45) Date of Patent: Feb. 5, 2019

(54) FUEL PELLETS FOR LASER FUSION

(76) Inventor: John E Stauffer, Greenwich, CT (US)

( * ) Notice: Subject to any disclaimer, the term of this patent is extended or adjusted under 35 U.S.C. 154(b) by 1533 days.

(21) Appl. No.: 13/156,544

(22) Filed: Jun. 9, 2011

(65) Prior Publication Data
US 2012/0314826 A1 Dec. 13, 2012

(51) Int. Cl.
G21B 1/19 (2006.01)
G21B 3/00 (2006.01)
G21B 1/03 (2006.01)
C25D 3/48 (2006.01)
C25D 7/00 (2006.01)

(52) U.S. Cl.
CPC .............. G21B 1/19 (2013.01); C25D 3/48 (2013.01); C25D 7/00 (2013.01); G21B 1/03 (2013.01); G21B 3/00 (2013.01); Y02E 30/16 (2013.01)

(58) Field of Classification Search
CPC ....................................................... G21B 1/19
See application file for complete search history.

(56) References Cited

U.S. PATENT DOCUMENTS

| 4,252,610 A * | 2/1981 | Halpern | G21B 1/19 376/152 |
|---|---|---|---|
| 4,290,847 A * | 9/1981 | Johnson et al. | 376/103 |
| 4,297,165 A * | 10/1981 | Breuckner | G21B 1/19 376/103 |
| 4,608,222 A * | 8/1986 | Brueckner | 376/104 |
| 5,618,394 A * | 4/1997 | Patterson | G21B 3/00 204/278.5 |
| 8,227,020 B1 * | 7/2012 | Miley | 427/62 |
| 2008/0256850 A1* | 10/2008 | Kley | B82Y 35/00 44/502 |
| 2009/0230318 A1* | 9/2009 | Fourkal | G21B 1/19 250/423 R |
| 2011/0261919 A1* | 10/2011 | Sefcik et al. | 376/152 |
| 2011/0286570 A1* | 11/2011 | Farmer | G21B 1/01 376/416 |

OTHER PUBLICATIONS

Miley, George H., et al., Advances in Proposed D-Cluster Inertial Confinement Fusion Target, 2010 J. Phys.: Conf. Ser. 244, available at http://iopscience.iop.org/1742-6596/244/3/032036.*
N. Asami, et al., Material Behavior of Highly Deuterated Platinum, The Seventh International Conference on Cold Fusion, 1998, p. 15-25, available at http://www.lenr-canr.org/acrobat/AsamiNmaterialbe.pdf.*

* cited by examiner

Primary Examiner — Sharon M Davis
(74) Attorney, Agent, or Firm — Haynes and Boone, LLP

(57) ABSTRACT

Fuel pellets for use as targets in thermonuclear fusion by inertial confinement are manufactured from a solid palladium core that contains deuterium tritium gases. The palladium core is covered with a tamper-ablator shell of heavy metal selected from the group including gold, platinum, and tungsten.

10 Claims, 1 Drawing Sheet

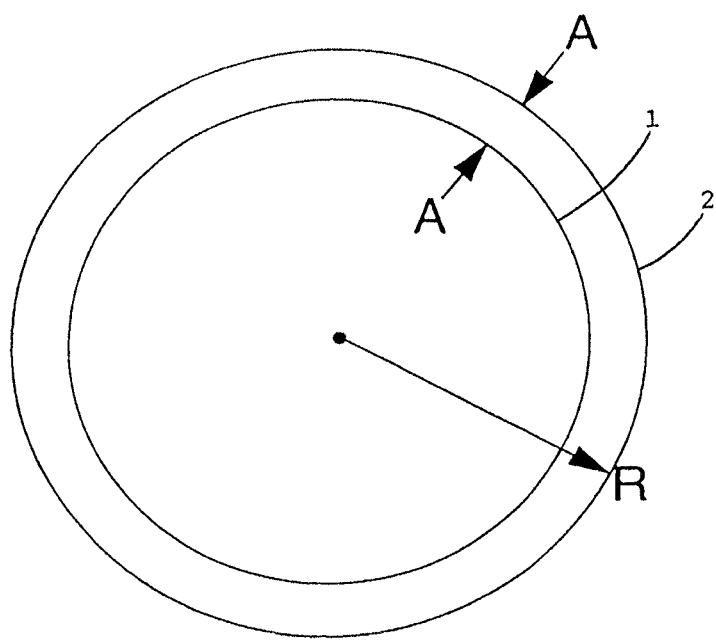

FUEL PELLETS FOR LASER FUSION

TECHNICAL FIELD

This disclosure relates to fuel pellets for use as targets in an apparatus designed to achieve thermonuclear fusion. Fuel pellets upon being stimulated by a laser beam initiate fusion.

BACKGROUND ART

After decades of research on inertial confinement fusion (ICF), the National Ignition Facility (NIF) was recently completed at the Lawrence Livermore National Laboratory in California. This installation is designed to demonstrate the nuclear fusion of the hydrogen isotopes, deuterium and tritium, known as D-T fuel. If successful, this achievement will be a milestone in the harnessing of nuclear energy for peaceful applications.

The guts of the NIF are 192 laser beams, which are focused on target pellets containing the D-T fuel. When subjected to the incident radiation, a capsule's outer shell ablates, causing the target to implode. Thereby tremendous pressure and temperatures are attained within the capsule-sufficient to initiate hydrogen fusion. The fuel is held together long enough by inertia in order to realize propagation of the burn.

While all the components of the NIF are vital to success, the design of the fuel pellets is of special concern. Deceptively simple in shape, these pellets must nevertheless perform to perfection. Physically they generally comprise a hollow sphere that is filled with the gaseous D-T fuel. The choice of materials for the shell, however, is critical.

The early designs for fuel pellets consisted of tiny glass spheres. They were easy to fabricate, had good diagnostics, and produced valuable data. However, looking for improvement in the coupling of the incident radiation, scientists sought newer materials for the pellets.

Attention then turned to plastics. These polymers were easy to mold and were available in many compositions. Most important, excellent sphericity and a high degree of smoothness could be attained. These capsules were filled with D-T fuel and then subjected to cryogenic temperatures. This cooling caused a thin layer of frozen or liquid D-T fuel to form on the inside surface of the plastic shell. Such a configuration was favored so as to achieve better implosion.

The latest pellet designs are contemplating novel materials for the fabrication of capsules. (Science & Technology Review, July/August 2007, pp. 12-19) One of these capsules has a copper-doped beryllium shell to which is attached a 10 micrometer fill tube to introduce the D-T fuel. The manufacturing process to make the pellets is complex and requires extraordinary care to meet specification. An alternative design to the beryllium capsule uses high-density carbon, which, like beryllium metal, has a low atomic number. Fabrication of these targets will be equally challenging.

SUMMARY

In one embodiment of solid core fuel pellets, pellets comprise a solid core of palladium containing deuterium and tritium fuel. The palladium core is coated with a heavy metal shell that implodes upon being zapped by laser beams.

Embodiments of solid core fuel pellets include a fuel pellet for use as a target in laser fusion research. This pellet comprises a solid core of palladium metal, which absorbs deuterium and tritium fuel. The proportion of deuterium to tritium may vary, but in general the object is to provide an equal molar mixture of these gases as required for nuclear fusion.

In the fusion reaction between deuterium and tritium, one atom of deuterium combines with one atom of tritium to produce one alpha particle (helium nucleus) and one neutron. Fusion research is focused on this reaction because among the many possible fusion reactions, this reaction may be the easiest to achieve. In embodiments of solid core fuel pellets, a palladium core is coated with a cladding of heavy metal (shell). This shell, called the tamper-ablator, couples with the incident laser beams, which heat the outer layer to produce a plasma. As the atomic particles fly apart, the rest of the cladding implodes toward the center of the pellet, thus compressing the palladium core.

The tamper-ablator consists of a heavy metal defined as one with a specific gravity greater than that of palladium. This criterion is met by such metals as gold, platinum and tungsten. Other metals, however, may also qualify in this respect.

In some embodiments of a solid core fuel pellet the physical dimensions of the fuel pellet are critical. The palladium inner core is a close to as possible perfectly spherical and has a smooth surface. The heavy metal shell has a uniform thickness and also has a smooth outer surface. Both core and shell are symmetrical. This arrangement enables maximum efficiency in the compression of the palladium.

Solid core fuel pellets differ radically from the prior art, which uniformly specifies pellets with gaseous cores of D-T fuel. By departing from traditional thinking, solid core fuel pellets offer renewed hope of attaining a breakthrough in laser fusion. Solid core fuel pellets provide the best chance to achieve ignition and go on to attain maximum gain—the excess of energy produced over the input radiation.

In one embodiment, a pellet for use as a target in laser fusion consists of a spherical core of solid palladium that is loaded with a mixture of deuterium and tritium gases, and is clad in a coating of heavy metal, the coating having a uniform thickness. Optionally, the heavy metal is gold. Optionally, the heavy metal is platinum. Optionally, the heavy metal is tungsten.

In another embodiment, a pellet for use in laser fusion includes a solid core loaded with hydrogen and a shell surrounding the solid core. Optionally, the solid core and shell are spherical and the shell has a uniform thickness. In one alternative, the solid core is a metal. Optionally, a first density of the shell is greater than a second density of the core. Optionally, the core is palladium. In one alternative, the shell is selected from a group consisting of gold, tungsten, and platinum. Alternatively, the palladium has been treated to remove oxygen. In another alternative, the hydrogen is a mixture of deuterium and tritium gases. Optionally, the solid core has a diameter measuring between 0.1 mm and 2 cm.

In one embodiment a method of creating a solid core fuel pellet includes forming a spherical core; charging the spherical core with hydrogen; and electroplating a tamper-ablator shell over the spherical core. In one alternative, the spherical core is palladium and the tamper-ablator shell is gold. Optionally, the spherical core is charged using electrolysis. In one embodiment, the method further includes heating the spherical core to eliminate oxygen prior to charging.

BRIEF DESCRIPTION OF THE DRAWING

For a fuller understanding of the nature and objects of embodiments of solid core fuel pellets, reference should be had to the following detailed description, taken in connection with the accompanying drawing.

FIG. 1 is a diagrammatic view of one embodiment of a solid core fuel pellet.

DETAILED DESCRIPTION

Embodiments of a solid core fuel pellet can be fabricated by techniques in common use by industries of mass production. This possibility is a great advantage in manufacturing such pellets in large volume, at low cost and in meeting stringent specifications. Expensive and time-consuming development work can thereby be avoided.

In one embodiment of a solid core fuel pellet, the core of a fuel pellet is a solid sphere of palladium metal. The purity of the palladium is considered to be important. Commercial grade palladium is available with an analysis of 99.99 percent pure. Because palladium can dissolve a small amount of oxygen at elevated temperatures, it is advisable to avoid such contamination. One precautionary step is to heat the palladium to a temperature as high as 600° C. under high vacuum to remove any absorbed gases.

The formation of the palladium sphere is quite important. The procedure is not unlike the manufacture of ball bearings, which are made in huge quantities for use in just about all rotating equipment. Quoting from a leading manufacturer of these balls, you chop off little chunks of coiled rod, a sort of thick metal wire, and then crush them into rough balls. These balls are then heated, ground and polished to produce truly round spheres. In one embodiment the core of solid core fuel pellets is created accordingly.

Surprisingly, such a relatively crude process can produce products within tight specifications. Higher quality balls of Grade 5 in relation to commercially related balls are round to within 1/5,000,000th of an inch. Furthermore, the balls have an ultra smooth finish such that they practically shine in the dark. The size of the palladium sphere can vary over a wide range. Anywhere from 0.5 to 2 millimeters in diameter is the size used for current laser fusion research. The upper limit is roughly set by the power of the laser beams and their potential to achieve ignition.

As the technology of laser fusion matures, larger pellets are contemplated. Thus, embodiments of solid core fuel pellets include the production of fuel pellets with a palladium core of 0.1 millimeter to 1 centimeter in diameter. In other embodiments, the size may vary according to the intensity and number of lasers used in the fusion process.

Once the palladium core has been formed it needs to be charged with the D-T fuel. In one embodiment, this procedure takes place in an electrolytic cell. The palladium sphere forms the cathode of the cell and a platinum wire serves as the anode. An electrolyte of heavy water (deuterium oxide) containing tritium oxide is used. To provide conductivity to the electrolyte, lithium can be added. Upon the application of a direct current, oxygen gas is formed at the anode and deuterium-tritium at the cathode. What sets the electrolysis reaction apart from other electrolytic cells is the remarkable ability of palladium to absorb hydrogen. At room temperature palladium is capable of being loaded up to 900 times its own volume with hydrogen. Thus, the D-T fuel formed at the cathode disappears into the palladium core without forming any bubbles. In essence, the hydrogen isotopes are compressed in the palladium metal to such an extent that their density is greater than that of the liquid state.

To finish the fabrication of the fuel pellet, a tamper-ablator coating needs to be applied to the palladium core. This shell functions as a pusher to compress the inner core of palladium when exposed to laser radiation. The outer layer of the tamper ablates, and due to the conservation of momentum, the remaining material implodes.

In order to function properly as a tamper, this material needs to couple with incident radiation. Higher atomic metals are more efficient in this regard. In addition, the tamper must effectively compress the palladium by avoiding Rayleigh-Taylor instabilities. Such hydrodynamic instabilities can ruin any attempts to squeeze the inner core. Rayleigh-Taylor instability occurs when a lighter material pushes on a heavier material. This is more likely to occur in this case if the other shell which is compressing the palladium has a lower specific gravity than the palladium. The turbulent effect of Rayleigh-Taylor instability is undesirable because they may prematurely limit compression. Therefore a heavier shell should be chosen.

According to Rayleigh-Taylor theory, the pusher element must have a greater density than the compressed material. Since palladium has a specific gravity of 12.0, a metal of greater density must be chosen. Several metals for this purpose come to mind, including platinum with a specific gravity of 21.45, gold with a specific gravity of 19.3, and tungsten with a specific gravity of 19.3.

The preferred means of generating the tamper-ablator shell is electroplating. This process is commonly used to plate gold and to a lesser extent platinum for decorative and industrial purposes. Using this technique, the palladium core is made the cathode in an electrolytic cell, which contains the electroplating solution or bath. For gold plating, this bath is generally an aqueous solution containing cyanide salt.

Because of the cost of gold, most films deposited by electroplating are relatively thin. This method, however, can produce coatings up to 1 millimeter. Electroforming, an extension of electroplating, can even provide objects with a wall thickness of 0.6 centimeter or more. Embodiments of a solid core fuel pellet provide for a shell of 0.5 millimeter or less in thickness. In any case, utmost care must be taken to assure a coating of uniform thickness and with a bright finish.

An embodiment of a solid core fuel pellet can best be visualized by reference to FIG. 1. In this diagram, R is the radius of the complete fuel pellet. The thickness of the tamper is indicated by the dimension A-A. The tamper itself is labeled 2 while the palladium core is denoted as 1. What is noteworthy about the figure is the perfect symmetry of the core and shell.

In many embodiments, palladium is chosen for the solid core, since in some configurations palladium may not interfere with the fusion reaction.

Recognizing the experimental nature of laser fusion, such an outcome is a possibility. The palladium core has certain advantages. First, palladium is uniquely permeable to all three isotopes of hydrogen. Moreover, the molecular hydrogen that is absorbed in palladium is converted into atomic hydrogen—the initial step in any fusion process. Additionally, when the palladium is compressed to high density, an effect called electron screening reduces the Coulomb repulsion between two nuclei. Coulomb Repulsion is an effect that repulses similarly charged particles from each other. Electron shielding occurs when electrons experience a decrease in attraction to the nucleus in higher orbitals due to the shielding of lower orbitals. This phenomenon increases the probability that the two nuclei will fuse to create a new element.

The physical properties of palladium are also significant. The initial shock wave from compression will travel through palladium and generate a hot spot. Palladium, like other metals, is highly compressible when subjected to extreme pressure. In this regard, this metal behaves like a gas. And finally, the inertia of palladium will hold the pellet intact for an extra split second-sufficiently long to propagate hydrogen fusion.

Example of an Embodiment

An electrolytic cell was assembled from a glass jar 2.5 inches in diameter by 4 inches high in an experiment to charge palladium with hydrogen. The anode was a strip of lead 1.5 inches wide by 4 inches high. The cathode consisted of a palladium rod 0.25 inches in diameter by 4 inches long. The palladium had an assay of 99.95 percent (metal basis). The electrolyte was prepared by dissolving 62.2 grams of lithium sulfate monohydrate ACS in 200 ml. of water. Initially the cell was charged at 2.8 volts for 30 minutes producing a current of 0.03 amp. No gas bubble formed at the palladium electrode, indicating that all the hydrogen was instantly absorbed. When the applied voltage was increased to 3.0 volts, the current rose to 0.07 amp. Still no gas appeared on the palladium rod although bubbles of oxygen formed on the lead anode. At the end of the run, the palladium electrode was in excellent condition, showing no signs of corrosion.

The foregoing description of the embodiments of the methods and configurations of a solid core fuel pellet has been presented only for the purpose of illustration and description and is not intended to be exhaustive or limited to the precise forms disclosed. Numerous modifications and adaptations will be apparent to those skilled in the art without departing from the spirit and scope of this disclosure.

What I claim is:

1. A pellet for use as a target in laser fusion, the pellet consisting of a spherical core of solid palladium that is loaded with a mixture of deuterium and tritium gases, and is clad in a coating of heavy metal, said coating having a uniform thickness.

2. The pellet of claim 1 in which the heavy metal is gold.

3. The pellet of claim 1 in which the heavy metal is platinum.

4. The pellet of claim 1 in which the heavy metal is tungsten.

5. A pellet for use in laser fusion, comprising:
(a) a solid core loaded with hydrogen, wherein the hydrogen is a mixture of deuterium and tritium gases and the solid core is palladium; and
(b) a shell surrounding the solid core.

6. The pellet of claim 5, wherein the solid core and shell are spherical and the shell has a uniform thickness.

7. The pellet of claim 5, wherein a first density of the shell is greater than a second density of the core.

8. The pellet of claim 5, wherein the shell is selected from a group consisting of gold, tungsten, and platinum.

9. The pellet of claim 8, wherein the palladium has been treated to remove oxygen.

10. The pellet of claim 5, wherein the solid core has a diameter measuring between 0.1 mm and 2 cm.

* * * * *